(12) United States Patent
Zimmermann

(10) Patent No.: US 7,938,057 B2
(45) Date of Patent: May 10, 2011

(54) PISTON PUMP WITH REDUCED CLEARANCE VOLUME

(75) Inventor: Marc Zimmermann, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 406 days.

(21) Appl. No.: 12/065,947

(22) PCT Filed: Aug. 22, 2006

(86) PCT No.: PCT/EP2006/065564
§ 371 (c)(1),
(2), (4) Date: Mar. 6, 2008

(87) PCT Pub. No.: WO2007/028707
PCT Pub. Date: Mar. 15, 2007

(65) Prior Publication Data
US 2008/0236385 A1    Oct. 2, 2008

(30) Foreign Application Priority Data

Sep. 6, 2005 (DE) .................. 10 2005 042 196

(51) Int. Cl.
*F16J 10/02* (2006.01)
*F16J 1/10* (2006.01)
*F04B 53/12* (2006.01)

(52) U.S. Cl. ................. 92/171.1; 92/129; 417/549

(58) Field of Classification Search ............. 92/129, 92/135, 171.1; 417/549
See application file for complete search history.

(56) References Cited

U.S. PATENT DOCUMENTS

| | | | |
|---|---|---|---|
| 6,079,961 A * | 6/2000 | Schuller et al. | ............... 92/129 |
| 6,267,569 B1 | 7/2001 | Alaze | |
| 6,283,724 B1 * | 9/2001 | Alaze et al. | ............... 417/470 |
| 2004/0105763 A1 | 6/2004 | Kondo | |

FOREIGN PATENT DOCUMENTS

EP    1 275 842 A2    1/2003

* cited by examiner

Primary Examiner — Michael Leslie
(74) Attorney, Agent, or Firm — Ronald E. Greigg

(57) ABSTRACT

The invention relates to a piston pump which is used to guide a fluid and which comprises a cylinder, a piston which is displacably arranged in the cylinder, a return element for the piston and a drive in order to displace the piston in the cylinder. The cylinder comprises a first area having a first internal diameter and a second area having a second internal diameter. The first internal diameter is greater than the second internal diameter.

20 Claims, 2 Drawing Sheets

PISTON PUMP WITH REDUCED CLEARANCE VOLUME

CROSS-REFERENCE TO RELATED APPLICATION

This application is a 35 USC 371 application of PCT/EP 2006/065564 filed on Aug. 22, 1006.

BACKGROUND OF THE INVENTION

1. Field of the Invention
2. Brief Description of the Prior Art

The present invention relates to a piston pump with reduced clearance volume, so that the efficiency of the piston pump can be increased. The piston pump of the invention is used particularly in brake systems of motor vehicles with active pressure buildup.

From the prior art, various embodiments of piston pumps are known. Piston pumps that are used particularly in brake systems of vehicles must have the lowest possible weight and the most compact possible construction. Piston pumps are known that aspirate a fluid through the piston into a pressure chamber and that increase the pressure of the aspirated fluid in the pressure chamber. The pressure chamber is disposed in a cylinder that has an inner bore of constant diameter. An outlet from the pressure chamber is provided in the base of the cylinder. Besides a restoring element for the piston, the pressure chamber also contains a check valve for closing or opening an inlet opening provided in the piston. In principle, such piston pumps have proven themselves, but it would be desirable to further increase the efficiency of such piston pumps and in particular to reduce the clearance volume.

SUMMARY OF THE INVENTION

The piston pump of the invention for pumping a fluid has the advantage over the prior art of improved efficiency. This is attained according to the invention by reducing a clearance volume of the piston pump. Moreover, the piston pump of the invention can be economically produced and installed, and it has an uncomplicated geometry for the sake of production. This is attained according to the invention by providing that a cylinder of the piston pump has a first region with a first inside diameter and a second region with a second inside diameter. The first inside diameter is greater than the second inside diameter. By using the second region with the shorter inside diameter, the clearance volume can be reduced significantly, compared to the known piston pumps. Moreover, for the same outer circumference of the cylinder, it is possible to select a larger diameter for the piston. It is thus also possible to use larger pumps in existing systems.

Preferably, a stroke of the piston takes place in the first region of the cylinder having the larger diameter. As a result, a diameter of the piston can be increased.

Also preferably, the first region is a stroke region of the piston in which the piston moves between top dead center and bottom dead center. The length of the first region of the cylinder in the axial direction of the cylinder may be equal to the maximum length of motion of the piston between top and bottom dead centers, so that the clearance volume is farther optimized. Alternatively, the length of motion of the piston between top and bottom dead centers may be somewhat less than the axial length of the first region of the cylinder.

Preferably, the second region is disposed immediately adjacent to a cylinder base.

Preferably, a top dead center of the piston is located at a connecting region between the first and second regions of the cylinder.

To enable the most streamlined possible design and in particular to enable simple production of the connecting region, the connecting region between the first and second regions of the cylinder is embodied as a tapering shoulder, especially with a constant pitch.

An angle of the connecting region from the first to the second region of the cylinder, embodied as a tapering shoulder, to a longitudinal axis of the cylinder is preferably between 10° and 80°, in particular between 20° and 50°, and especially preferably amounts to 30° or 45°. Angles of 30° and 45° are especially simple and economical to produce without special tools.

In a further preferred feature of the invention, a recess, for fixing the restoring element for the piston, is formed in the second region of the cylinder.

The recess is preferably an annular groove. The annular groove especially preferably extends directly adjacent to the base of the cylinder.

The piston pump of the invention is especially preferably used in a brake system for vehicles. The brake system is preferably a system with active pressure buildup, such as an ABS, ESP, or traction control system. The piston pump of the invention can also be employed in automated parking brakes, such as EHB systems.

BRIEF DESCRIPTION OF THE DRAWINGS

The present invention is described in detail below in conjunction with the accompanying drawings, in which.

DESCRIPTION OF THE PREFERRED EMBODIMENTS

Below, one exemplary embodiment of the invention is described in detail in conjunction with FIGS. 1 and 2.

Figure 1:
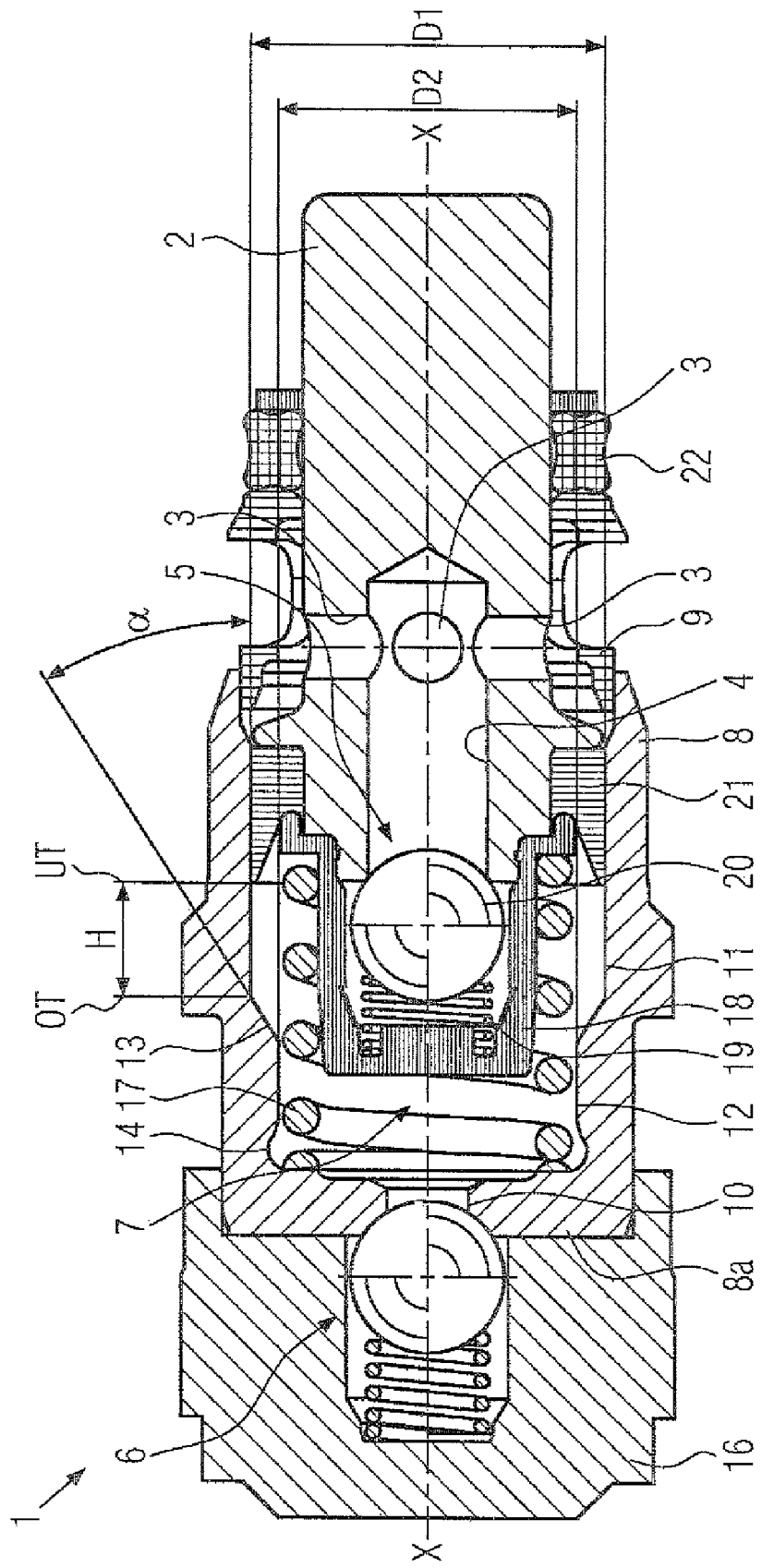
FIG. 1 is a schematic sectional view of a piston pump in one exemplary embodiment of the present invention.

As can be seen from FIG. 1, the piston pump 1 of the invention includes a piston 2, which is disposed capable of reciprocation in a cylinder 8. The piston 2 is driven by means of a drive mechanism not shown, such as an eccentric drive mechanism. In the piston 2, a plurality of transverse bores 3 are provided, along with one longitudinal bore 4 into which the transverse bores 3 discharge. Fluid is delivered radially through a filter 9 into the transverse bores 3 and then into the longitudinal bore 4.

The piston pump 1 further includes a pressure chamber 7, which is disposed in the cylinder 8. An inlet valve 5, which includes a cage element 18, a spring 19, and a ball 20, closes the longitudinal bore 4, and an outlet valve 6 is disposed at an outlet opening 10 formed in the cylinder. The inlet valve 5 and the outlet valve 6 are thus each embodied as check valves. As shown in FIG. 1, the outlet valve 6 is disposed in a cap element 16.

The piston 2 is sealed off from the cylinder 8 by means of a sealing element 21. Reference numeral 22 identifies a further sealing element on the piston. In the pressure chamber 7, a restoring element 17 for the piston 2 is also provided, in the form of a spiral spring. As can be seen from FIG. 1, the restoring element 17 is braced between a base 8a of the cylinder 8 and the cage element 18.

Figure 2:
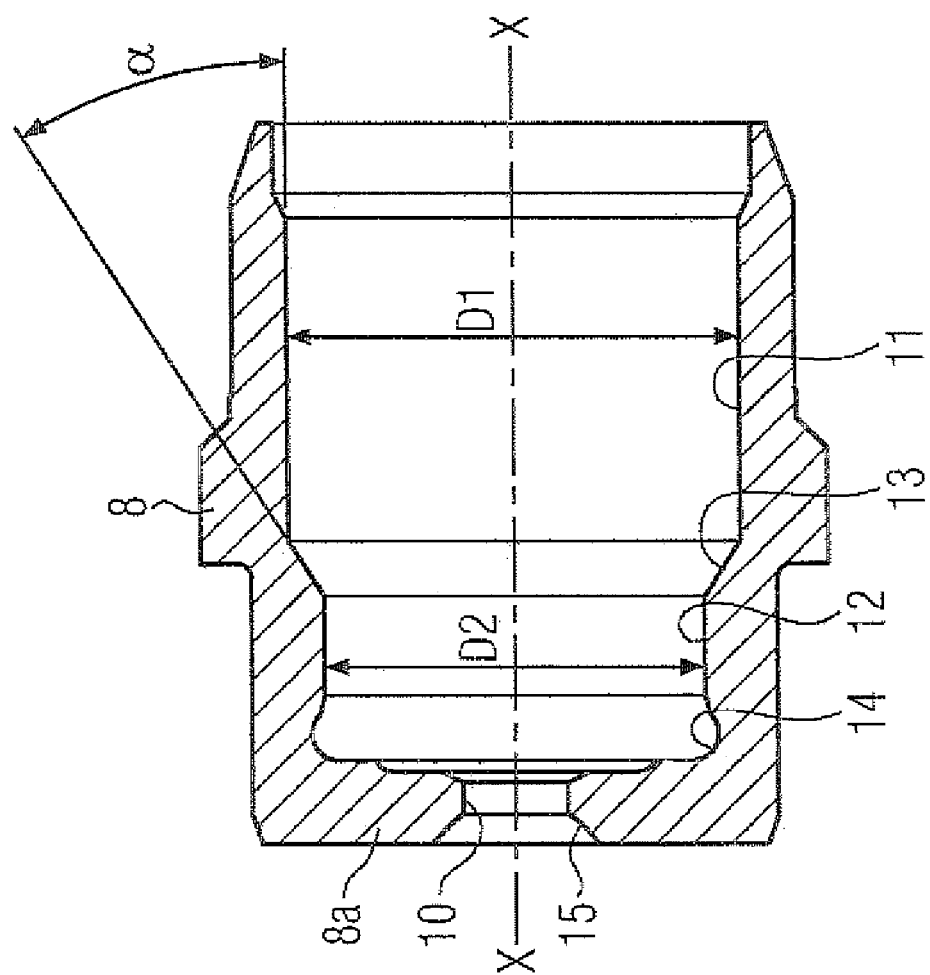
FIG. 2 is a schematic sectional view of a cylinder shown in FIG. 1.

The cylinder 8 is shown in detail in FIG. 2. As can be seen from FIG. 2, the cylinder 8 has a first region 11 and a second region 12. The first region 11 has an inside diameter D1, and the second region 12 has an inside diameter D2. The inside diameter D1 is greater than the inside diameter D2.

Between the first region 11 and the second region 12, a transition region 13 is formed, which is provided in conical form, with a constant pitch. An angle between a longitudinal axis X-X of the cylinder 8 and the transition region 13 is marked α and in this exemplary embodiment amounts to 30°. An outlet valve seat 15 is also provided at the outlet opening 10 and is shaped in complementary fashion to a ball of the outlet valve 6. In the cylinder bore adjacent to the base 8a of the cylinder 8, an annular recess 14 is also formed along the entire inside circumference of the cylinder 8. The annular recess 14 serves to fix the restoring element 17 and to reduce the pressure stress in the notch and has a curved shape in section, corresponding to the wire cross section of the restoring element 17.

As can be seen from FIG. 1, the inside diameter D2 of the second region 12 is somewhat greater than an outside diameter of the restoring element 17.

FIG. 1 shows the position of the piston pump 1 at its bottom dead center. The length H in the longitudinal axis X-X of the piston pump 1 indicates the maximum stroke height between bottom dead center UT and top dead center OT. In FIG. 1, UT and OT mark the respective positions of the piston end at bottom and top dead center, respectively. As can be seen from FIG. 1, top dead center is located precisely at the end of the first region 11, at the transition to the transition region 13.

The function of the piston pump of the invention is as follows. Beginning at a position of the piston 2 at top dead center OT, the piston 2 moves to the right as a result of the restoring force of the restoring element 17, and as a result the inlet valve 5 opens. During the motion from top dead center OT to bottom dead center UT, fluid is aspirated radially through the filter 9 and the transverse bores 3. From the transverse bores 3, the fluid flows via the longitudinal bore 4 and the opened inlet valve 5 into the pressure chamber 7. In the position at bottom dead center UT as shown in FIG. 1, the direction of motion of the piston 2 reverses, so that the piston 2 is moved in the direction of the outlet valve 6. Because of the reversal of the direction of motion, the inlet valve 5 closes, so that a pressure buildup in the pressure chamber 7 ensues. The restoring element 17 is compressed in the process. The pressure buildup continues until such time as a pressure in the pressure chamber 7 is greater than a restoring force of the spring of the outlet valve 6. Once the pressure in the pressure chamber 7 is greater than the restoring force of the outlet valve 6, the outlet valve opens, so that the fluid under pressure in the pressure chamber 7 can flow out via the outlet opening 10. This state is attained preferably just before reaching top dead center OT of the piston 2.

By means of the construction according to the invention of the cylinder 8, a clearance volume of the piston pump 1 can now be reduced. More precisely, in comparison to the known piston pumps, which have only a cylinder bore of constant diameter in the cylinder, the clearance volume is reduced by an annular space radially to the second region 12 having an inside diameter D2 and an outside diameter D1. For instance, if an inside diameter D2 is 8 mm and an inside diameter D1 is 9.6 mm, the clearance volume of the piston pump, for a length of the second region 12 of approximately 4 mm in the axial direction, is reduced by 40%. Thus according to the invention, markedly improved efficiency of the piston pump 1 can be furnished, and outgassing of the fluid can be reduced. The reduction according to the invention of the diameter of the cylinder bore in the second region 12 can be accomplished very simply and economically. In particular, there is no need to change the outside dimensions of the piston pump. The transition region 13 between the first and second regions 11, 12 may be furnished equally simply by means of a countersinking element or a stepped drill.

Moreover, by the provisions of the invention, the strength of components can be improved, particularly in the vicinity of the cylinder base 8a and the adjoining cylinder walls, which have a greater thickness than the cylinder walls in the vicinity of the first region 11.

The foregoing relates to the preferred exemplary embodiments of the invention, it being understood that other variants and embodiments thereof are possible within the spirit and scope of the invention, the latter being defined by the appended claims.

The invention claimed is:

1. A piston pump for pumping a fluid, comprising: a cylinder, a piston disposed movably within an inner bore of the cylinder, a pressure chamber disposed in the inner bore of the cylinder, an inlet valve attached to an end of the piston facing the pressure chamber, a restoring element for the piston, and a drive mechanism for moving the piston in the cylinder, the drive mechanism moving the piston between a bottom dead center and a top dead center, wherein the pressure chamber has a first region with a first inside diameter and a second region with a second inside diameter, the first inside diameter being greater than the second inside diameter, and wherein the piston, as it moves from bottom dead center to top dead center, at least partially immerses the inlet valve into the second region of the pressure chamber having the smaller inside diameter.

2. The piston pump as defined by claim 1, wherein a stroke of the piston takes place in the first region of the cylinder.

3. The piston pump as defined by claim 1, wherein the first region is a stroke region of the piston in which the piston moves between top dead center and bottom dead center.

4. The piston pump as defined by claim 2, wherein the first region is a stroke region of the piston in which the piston moves between top dead center and bottom dead center.

5. The piston pump as defined by claim 1, wherein the second region is disposed adjacent to a cylinder base.

6. The piston pump as defined by claim 2, wherein the second region is disposed adjacent to a cylinder base.

7. The piston pump as defined by claim 3, wherein the second region is disposed adjacent to a cylinder base.

8. The piston pump as defined by claim 1, wherein top dead center of the piston is disposed at a position at the transition between the first region and a connecting region, and the connecting region is disposed between the first and second regions of the cylinder.

9. The piston pump as defined by claim 2, wherein top dead center of the piston is disposed at a position at the transition between the first region and a connecting region, and the connecting region is disposed between the first and second regions of the cylinder.

10. The piston pump as defined by claim 3, wherein top dead center of the piston is disposed at a position at the transition between the first region and a connecting region, and the connecting region is disposed between the first and second regions of the cylinder.

11. The piston pump as defined by claim 5, wherein top dead center of the piston is disposed at a position at the transition between the first region and a connecting region, and the connecting region is disposed between the first and second regions of the cylinder.

12. The piston pump as defined by claim 8, wherein the connecting region between the first and second regions of the cylinder is embodied as a tapering shoulder.

13. The piston pump as defined by claim 9, wherein the connecting region between the first and second regions of the cylinder is embodied as a tapering shoulder.

14. The piston pump as defined by claim 10, wherein the connecting region between the first and second regions of the cylinder is embodied as a tapering shoulder.

15. The piston pump as defined by claim 11, wherein the connecting region between the first and second regions of the cylinder is embodied as a tapering shoulder.

16. The piston pump as defined by claim 1, wherein a recess, for fixing the restoring element for the piston, is formed in the second region of the cylinder.

17. The piston pump as defined by claim 2, wherein a recess, for fixing the restoring element for the piston, is formed in the second region of the cylinder.

18. The piston pump as defined by claim 3, wherein a recess, for fixing the restoring element for the piston, is formed in the second region of the cylinder.

19. The piston pump as defined by claim 5, wherein a recess, for fixing the restoring element for the piston, is formed in the second region of the cylinder.

20. A brake system for a vehicle, in particular with active pressure buildup, including a piston pump as defined by claim 1.

* * * * *